United States Patent [19]

Toussaere

[11] Patent Number: 5,930,412
[45] Date of Patent: Jul. 27, 1999

[54] ELECTRO-OPTICAL COMPONENT

[75] Inventor: Eric Toussaere, Chatillon, France

[73] Assignee: France Telecom, Paris, France

[21] Appl. No.: 08/878,048

[22] Filed: Jun. 18, 1997

[30] Foreign Application Priority Data

Jun. 18, 1996 [FR] France .................................. 96 07528

[51] Int. Cl.[6] .................................................. G02B 6/42
[52] U.S. Cl. ..................................... 385/3; 385/8; 385/40
[58] Field of Search ................................... 385/3, 2, 5, 8, 385/40, 41, 42, 12

[56] References Cited

U.S. PATENT DOCUMENTS

| | | | |
|---|---|---|---|
| 3,589,794 | 6/1971 | Marcatili ................................... | 350/96 |
| 4,691,984 | 9/1987 | Thaniyavarn ............................... | 385/3 |
| 5,031,236 | 7/1991 | Hodgkinson et al. .................... | 455/619 |
| 5,285,507 | 2/1994 | Van Der Tol ............................. | 385/11 |
| 5,388,001 | 2/1995 | Okayama et al. ........................ | 359/629 |
| 5,654,818 | 8/1997 | Yao .......................................... | 359/246 |
| 5,708,734 | 1/1998 | Van Der Tol ............................. | 385/11 |
| 5,733,481 | 3/1998 | Hayashida et al. ...................... | 252/582 |
| 5,802,222 | 9/1998 | Rasch et al. ............................. | 385/1 |

FOREIGN PATENT DOCUMENTS

| | | | |
|---|---|---|---|
| 0 752 607 | 7/1996 | European Pat. Off. ........ | G02F 1/035 |
| 2496344 | 12/1981 | France ............................. | H01P 1/16 |
| 2095419 | 3/1982 | United Kingdom ............. | G02F 2/00 |

OTHER PUBLICATIONS

Liang J et al., Thermally Stable Cross–Linked Polymers for Electro–Optic Applications, Journal De Physique III, Dec. 1994, France, vol. 4, No. 12, pp. 2441–2450.

*Primary Examiner*—Rodney Bovernick
*Assistant Examiner*—Ellen E. Kang
*Attorney, Agent, or Firm*—Blakely, Sokoloff, Taylor & Zafman

[57] ABSTRACT

The modulator includes a TE⇌TM converter (3) between two electro-optical modulators (1, 2). The coupler includes two directional couplers interconnected via branches each including a TE⇌TM converter. Another electro-optical component includes a light guide that is folded and metallization that extends at least over two juxtaposed portions of light guide.

7 Claims, 6 Drawing Sheets

FIG_1

FIG_2

FIG_3

FIG_4

FIG_5

FIG_6

FIG_7

FIG_8a

FIG_8b

FIG_9a

FIG_9b

FIG_10

FIG_11a

FIG_11b

FIG_12

FIG_13a

FIG_13b

FIG_14

FIG_15a

FIG_15b

FIG_16

FIG_17

FIG_18

FIG_19

FIG_20

FIG_21

FIG_22

FIG_23

FIG_24

FIG_25

ELECTRO-OPTICAL COMPONENT

The present invention relates to electro-optical components.

Electro-optical polymers have great potential in the field of telecommunications. It is envisaged to use them in fiber to the home (FTTH) distribution networks since they are suitable for enabling components to be fabricated at low cost. They make it simple to fabricate waveguides on a variety of substrates. When the oriented polymer is placed between electrodes, the application of a modulating electric field between the electrodes makes it possible to modulate the refractive index of the polymer by the Pockels effect. This gives rise to a phase shift in the guided light wave; the phase shift can be used for processing the optical signal (modulation, switching, etc.).

An object of the invention is to propose improvements to presently-known electro-optical components.

For the electro-optical effect, three types of electrode geometry are distinguished: geometries having plane electrodes; those having transverse electrodes; and those having coplanar electrodes.

For plane electrode geometries, a plane capacitor is formed with the electro-optical polymer being placed between the electrodes. The polymer is vertically oriented, either during the technological steps of making the waveguide, or else once its structure has been defined. The electro-optical coefficients induced during orientation satisfy the following relationship:

$$r_{33} \approx 3 r_{13}$$

modulation of the TM polarized wave is thus three times more effective than modulation of the TE wave: such a structure is sensitive to the polarization of the waveguide.

The same principles are applicable for electrodes that are transverse or coplanar: under such circumstances, the molecules are oriented either horizontally or vertically, and the Pockels effect depends on the polarization of the guided light wave. For transverse electrodes, TE polarization is the more modulated, whereas for coplanar electrodes, it is TM polarization that is the more modulated. Under such circumstances, electric field carryover is less effective.

As will have been understood, conventional electrode geometries do not enable the optical signal to be processed in a manner that is independent of (insensitive to) polarization.

Unfortunately, polarization-insensitivity is most important: an optical signal in a telecommunications network can have any polarization. For example, in the case of an intensity modulator, if only one component of the polarization is modulated, then the extinction ratio of the signal will be low. If polarization is scrambled prior to the modulator, the extinction ratio is improved, but signal intensity is attenuated by 3 dB.

Present research into polarization independence for polymer modulators is directed:

either to optimized materials (molecules of 8-pole nature oriented in non-centrosymmetric manner), but the technologies envisaged are not yet operational;

or to a succession of electrodes that modulate TE and TM modes in succession.

In this respect, reference may advantageously be made to the following:

T. Gase, A. Braüer, and W. Karthe, "Polarization insensitive phase modulator bases on polymers for hybrid integration", Proc. ECIO (Delft, Netherlands), 1995, S120.

Nevertheless, that technology is complex and seems poorly adapted to high-frequency uses.

The invention proposes an electro-optical component which is insensitive to the polarization of the incident light wave.

The solution of the invention consists in an optical component of the type comprising a light guide whose core is made of an electro-optical material, the component being characterized in that it includes a TE$\leftrightarrows$TM converter between two electro-optical modulators.

Technologies have also been known for a long time that make it possible to fabricate curved waveguides.

In this respect, reference may be made, for example, to the following publication:

"Bends in optical dielectric guides", E. A. J. Marcatili, The Bell System Technical Journal, September 1969, pp. 2102–2133;

and more recently to:

"Design and fabrication of electro-optic polymer waveguides" by J. Liang, R. Levenson, and J. Zyss, ACS/OSA 93 (Toronto)—Topical Meeting—Organic Thin Films for Photonic Applications.

Nevertheless, presently-known light guides made of electro-optical components are generally substantially rectilinear.

Electro-optical components are usually fabricated on the basis of ferroelectric crystals or on the basis of semiconductors.

Unfortunately, in such materials, the waveguide is generally made by locally altering the refractive index. Index differences between the core and the cladding of the waveguides are small (0.001), so the waveguides of such components must present substantially linear geometry in order to minimize bend losses (angle less than 0.1°).

It should also be observed that research effort on components is mainly directed at present to optimizing active materials, and in particular to improving their electro-optical coefficients.

The invention also proposes an optical component including a light guide whose core is made of an electro-optical material, together with at least one area of metallization over a portion of said light guide, for the purpose of controlling it, the component being characterized in that said light guide is folded and in that the metallization extends over at least two portions of the light guide extended in folded manner relative to each other.

The electro-optical material is advantageously a polymer material.

In particular, such a structure is advantageously applied to capacitive components, i.e. components controlled at frequencies that are less than or of the order of GHz, since it makes it possible to reduce the size or the control voltage thereof. A compromise thus needs to be optimized between control voltage, passband, and size.

Another advantageous application of the invention lies in travelling wave components. The metallization is then used as a microwave transmission line and the optical signal propagates in those portions of the waveguide over which the metallization extends on the same axis and in the same direction as the microwave signal propagating in the metallization.

Such a component has a microwave line of reduced length, thereby limiting attenuation of the microwave, and reducing the size of the component.

Also, the light guide of the component advantageously includes a polarization converter disposed between two portions over which there extends the control metallization.

Such a structure makes it possible to use the same metallization to modulate in succession both polarizations of propagation in the light guide; the passband is small, but a component is obtained that is simple to use, in particular for modulation at microwave frequency.

The component proposed by the invention can be monolithically integrated in any optical component, in particular in a Mach-Zehnder component, an optical switch (e.g. a drop-and-insert modulator), or any other active component using the electro-optical effect over a linear waveguide portion.

Other characteristics and advantages of the invention appear further from the following description. The description is purely illustrative and non-limiting. It should be read with reference to the accompanying drawings, in which.

Figure 1:
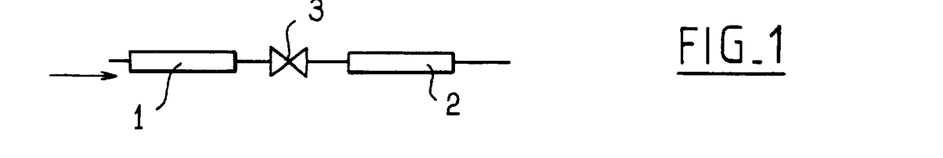
FIG. 1 is a diagram of a phase modulator that is insensitive to polarization in accordance with a possible embodiment of the invention.

The polarization-independent phase modulator shown in FIG. 1 comprises two identical phase modulators 1 and 2 having a TE⇌TM converter referenced 3 disposed between them.

By way of example, the modulators 1 and 2 are electro-optical modulators of the hollow type described in greater detail below with reference to FIGS. 19 et seq.

The TE⇌TM converter is a converter of the type described in the following publication:

(M. C. Oh et al., Appl. Phys. Lett 67 (13) (1995) pp. 1821(1823).

For example, when the modulators 1 and 2 have plane electrodes, the TM component is modulated initially via the $r_{33}$ component in the first modulator, and it is then converted into TE polarization by the converter after which it is modulated via the $r_{13}$ coefficient in the second modulator. The incident TE component is modulated via the $r_{13}$ coefficient in the first modulator and is then converted into TM polarization by the converter so as subsequently to be modulated via the $r_{33}$ coefficient in the second modulator. If both modulators are of the same length, then the modulation effect will be the same for both polarizations.

FIGS. 2 to 7 show other variant embodiments of the invention.

Figure 2:
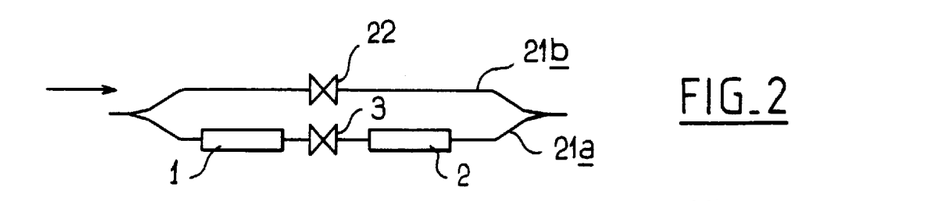
FIGS. 2 to 5 are diagrams of intensity modulators that are insensitive to polarization, in accordance with various possible embodiments of the invention.

The device shown in FIG. 2 is a polarization-independent Mach-Zehnder type intensity modulator.

One of its two branches, referenced 21a, includes a circuit of the type shown in FIG. 1.

Its other branch, referenced 21b includes a TE⇌TM converter, given reference 22.

Figure 3:
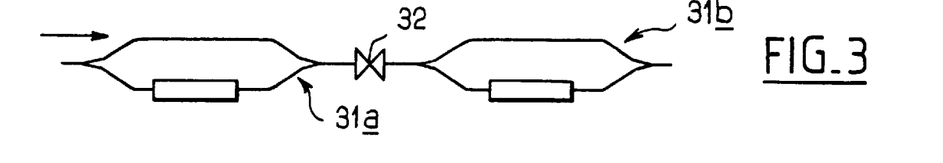

FIG. 3 shows another possible embodiment of a polarization-insensitive intensity modulator.

This modulator has two conventional Mach-Zehnder type intensity modulators 31a and 31b connected in series with a TE⇌TM converter referenced 32 disposed between them.

Figure 4:
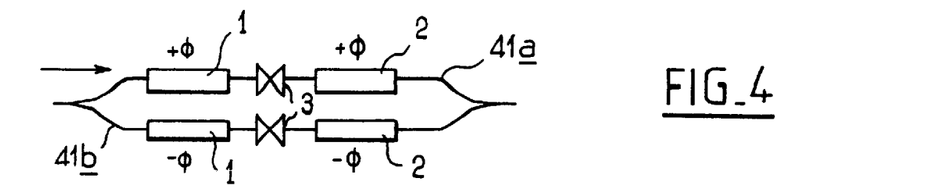

In another variant, as shown in FIG. 4, it is possible to use phase modulators of the type shown in FIG. 1 in each of the two branches 41a and 41b of a Mach-Zehnder circuit. The elementary modulators perform phase modulation of opposite sign.

This provides a push-pull configuration that is independent of polarization.

Figure 5:
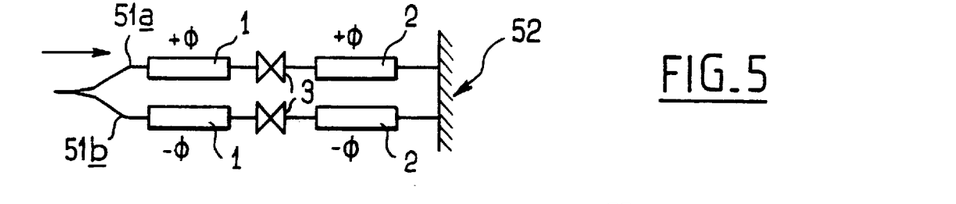

Likewise, as shown in FIG. 5, the modulator of FIG. 1 can be used on each of the two branches 51a and 51b of a mirror intensity modulator (half Mach-Zehnder in which each branch 51a and 51b is terminated by a mirror 52) for the purpose of providing a push-pull configuration that is independent of polarization.

Figure 6:
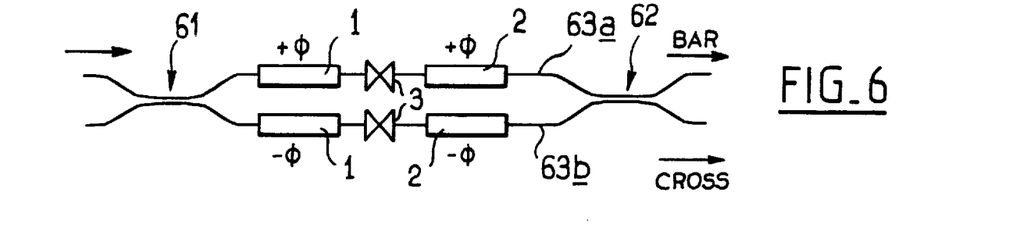
FIG. 6 is a diagram of a 2×2 coupler that is insensitive to polarization.
Figure 7:
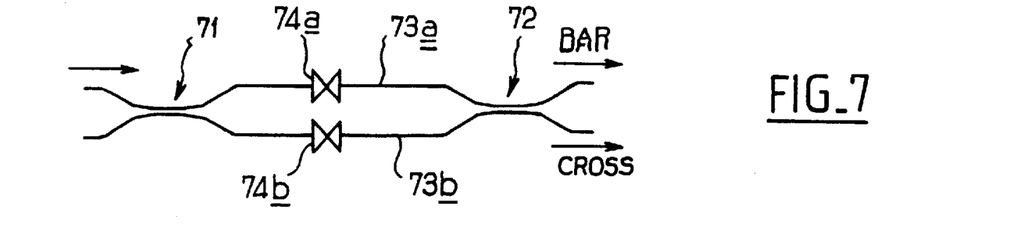
FIG. 7 is a diagram of a 2×2 directional coupler that is insensitive to polarization.

In another variant, as shown in FIGS. 6 and 7, the invention can be used for making polarization-independent directional couplers.

In FIG. 6, a push-pull Mach-Zehnder configuration of the type shown in FIG. 4 is disposed between two directional coupler 61 and 62, the two branches 63a and 63b of said configuration extending the outlet branches of the inlet coupler 61 and being extended by the inlet branches of the outlet coupler 62. More precisely, the 3 dB directional couplers are of the type including pairs of waveguides which are juxtaposed and which extend parallel over a fraction of their lengths.

In FIG. 7, the outlet and inlet branches respectively of two electro-optical directional couplers 71 and 72, an inlet coupler and an outlet coupler, are interconnected by two branches 73a and 73b, each of which has a polarization converter 74a or 74b integrated therein.

It is known that a directional coupler whose waveguides have electro-optical cores is sensitive to polarization.

The configuration of FIG. 7 makes it possible to implement a switch that is insensitive to polarization.

The total variation of coupling length for a given polarization in this case is the sum of the variations of the couping lengths of a directional coupler for each polarization.

FIGS. 8 to 18 show the polarization characteristics of the various components described above.

The various curves were obtained by assuming that a TE⇌TM converter modulates the TE and TM modes over a distance equal to the coupling length, i.e. as an imperfect converter, but one for which the effects of its imperfections on the output performance of the component can be predicted.

An angle $\phi_0$ associated with contrast (expressed in dB) is defined as follows:

$$\text{contrast} = -20 \cdot \log(\tan(\phi_0))$$

For a polarization-insensitive phase modulator, the amplitudes of the TE and TM components are expressed as a function of the phase shifts of the modulators 1 and 2 (referenced by subscripts 1 and 2) of the angle $\phi_0$, and of the amplitudes of the waves prior to modulation, as follows:

$$\begin{pmatrix} E_{TE} \\ E_{TM} \end{pmatrix} = -i \begin{pmatrix} \sin(\phi_0)e^{i(\phi TE,1+\phi TE.2)} & \cos(\phi_0)e^{i(\phi TE,2+\phi TM,1)} \\ \sin(\phi_0)e^{i(\phi TE,1+\phi TM.2)} & -\sin(\phi_0)e^{i(\phi TM,1+\phi TM.2)} \end{pmatrix} \begin{pmatrix} E_{TE,0} \\ E_{TM,0} \end{pmatrix}$$

In the ideal case where the phase shifts induced by the modulators 1 and 2 are identical, and where $\phi_0=0$ (infinite contrast), phase modulation is obtained that is independent of polarization (together with conversion of polarization):

$$\begin{pmatrix} E_{TE} \\ E_{TM} \end{pmatrix} = -i \begin{pmatrix} 0 & e^{i(\phi TE,2+\phi TM,1)} \\ e^{i(\phi TE,1+\phi TM.2)} & 0 \end{pmatrix} \begin{pmatrix} E_{TE,0} \\ E_{TM,0} \end{pmatrix}$$

Figure 8A:
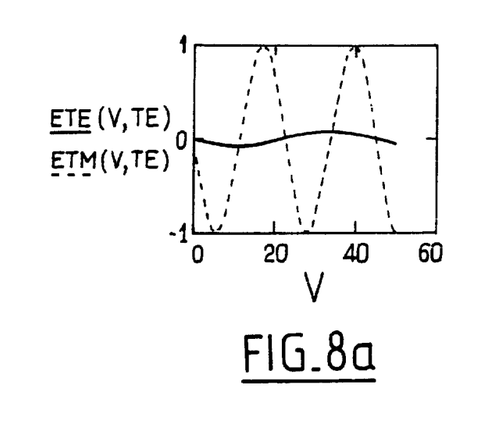
FIGS. 8a and 8b are graphs in which mode amplitude is plotted as a function of the modulating voltage applied to the elementary modulators of the circuit of FIG. 1.
Figure 8B:
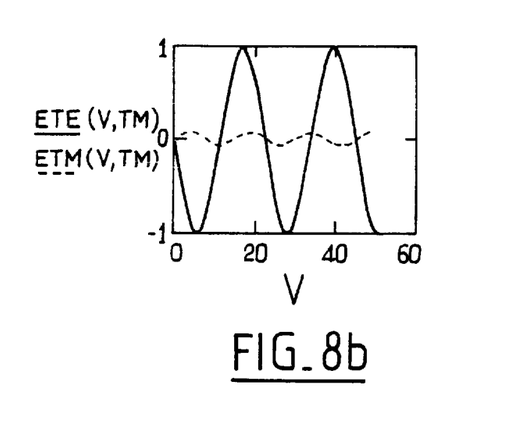

With a converter that is not perfect, the main terms are modulated with the same phase, but there remains residual modulation on the second component of the polarization. This is shown in FIGS. 8a and 8b where mode amplitudes are plotted as a function of modulation voltage applied to the modulators 1 and 2.

Figure 9A:
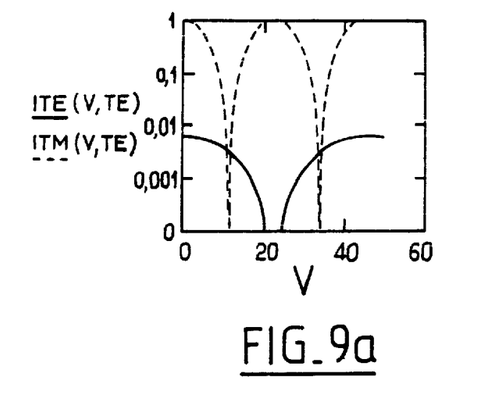
FIGS. 9a and 9b are graphs in which mode intensity is plotted as a function of the modulating voltage applied to the elementary modulators of the circuit of FIG. 1.
Figure 9B:
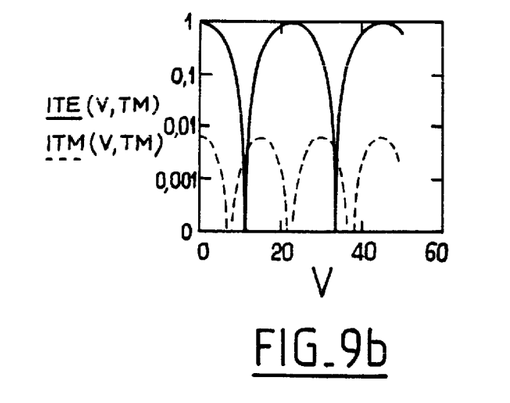

The case of a polarization-insensitive Mach-Zehnder modulator including an imperfect TE⇌TM converter (contrast 22 dB), is shown in FIGS. 9a and 9b where the intensity of each outlet mode for an inlet TE or TM mode is plotted. The extinction voltage is smaller than the extinction voltage of each modulator taken independently since the phases of the two phase modulators add. It will be observed that the residual component (cross-talk), due to the imperfection of the converter is negligible compared with the main component of the signal.

Figure 10:
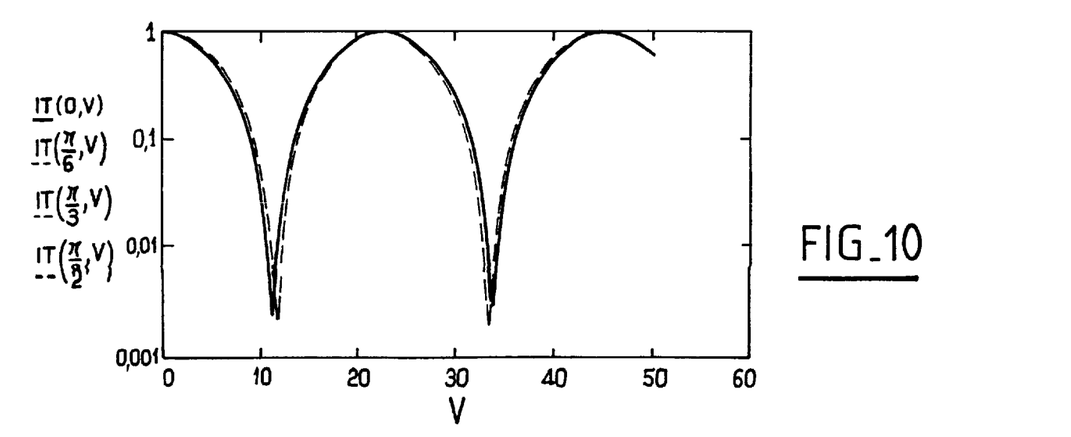
FIG. 10 is a graph in which total output intensity from the FIG. 2 modulator is plotted for various angles of input polarization, as a function of modulating voltage.

In FIG. 10, the total intensity at the outlet for various angles of polarization at the inlet (assumed to be linear for simplification purposes) is plotted as a function of modulation voltage.

Figure 11A:
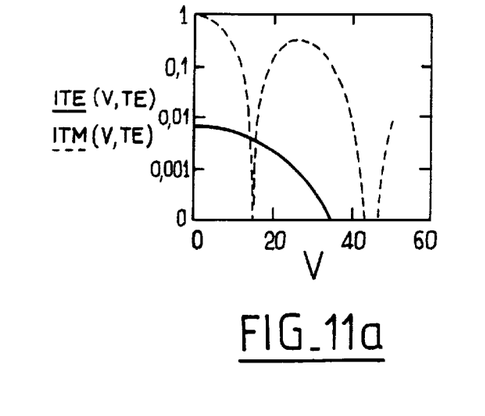
FIGS. 11a, 11b, and 12 are graphs analogous to those of FIGS. 9a, 9b, and 10, for the FIG. 3 modulator.
Figure 11B:
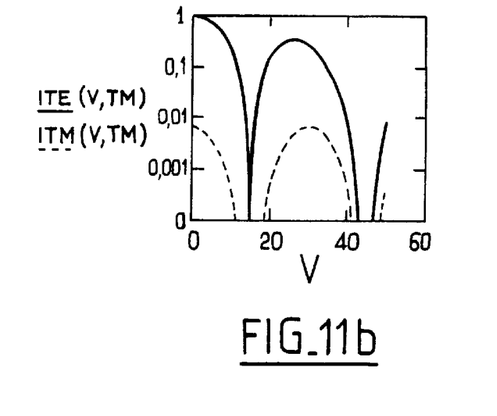
Figure 12:
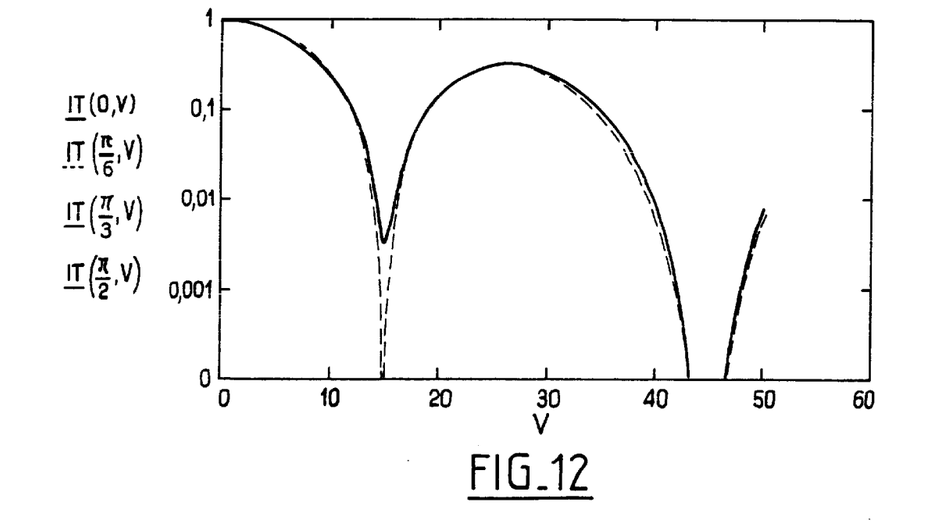

The case of two Mach-Zehnder modulators in series with a polarization converter (FIG. 3 configuration) is shown in FIGS. 11a, 11b, and 12. As can be seen in these figures, this configuration provides polarization independence, but this case is less favorable than the preceding case: its extinction voltage is equal to the smaller of the extinction voltages since, in this case, the product is taken of the intensity modulation performed by each of the modulators.

Figure 13A:
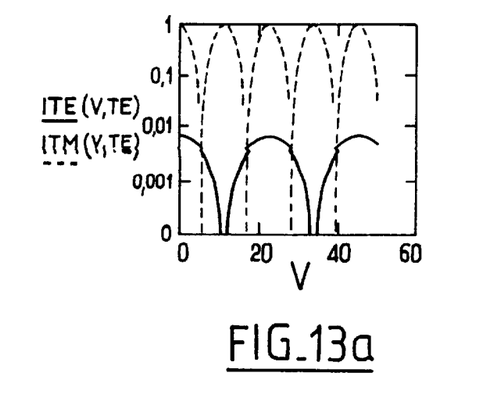
FIGS. 13a, 13b, and 14 are graphs analogous to those of FIGS. 9a, 9b, and 10, for the FIG. 4 modulator.
Figure 13B:
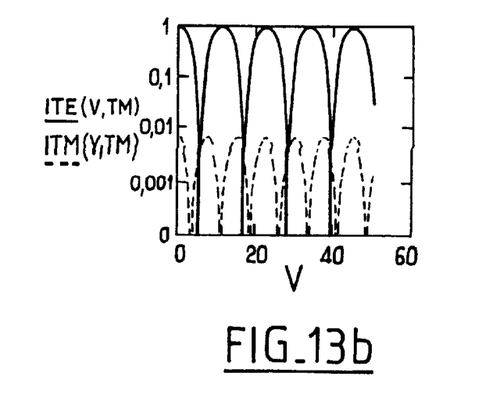
Figure 14:
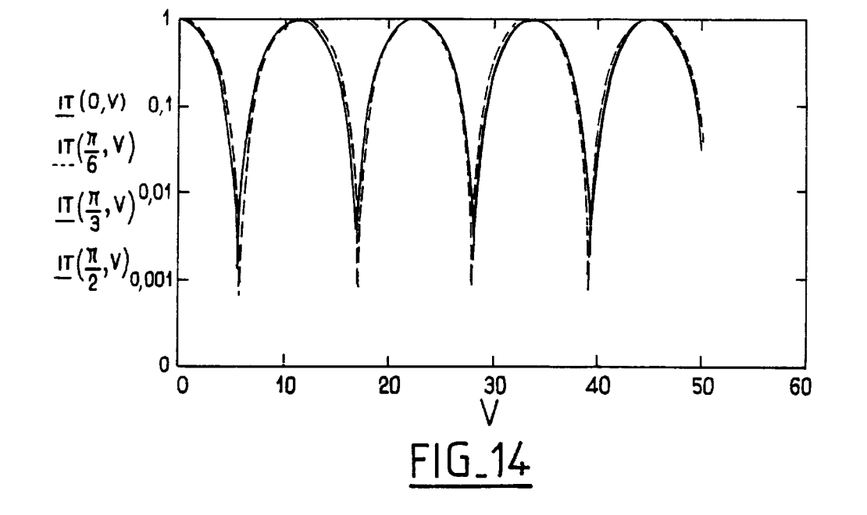

The push-pull effect, independent of polarization, is shown in FIGS. 13a, 13b, and 14 for a Mach-Zehnder modulator having phase modulators in series with a polarization converter (FIG. 4 configuration). Polarization independence is achieved and the extinction voltage is reduced by a factor of two compared with a Mach-Zehnder modulator of the type shown in FIG. 2.

Figure 15A:
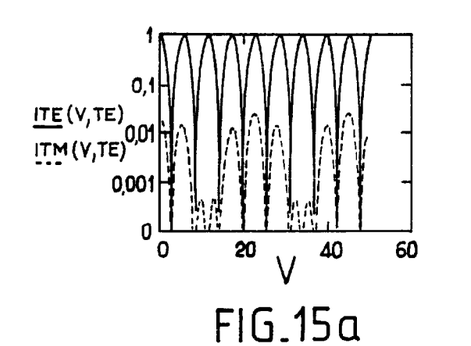
FIGS. 15a, 15b, and 16 are graphs analogous to those of FIGS. 9a, 9b, and 10, for the FIG. 5 modulator.
Figure 15B:
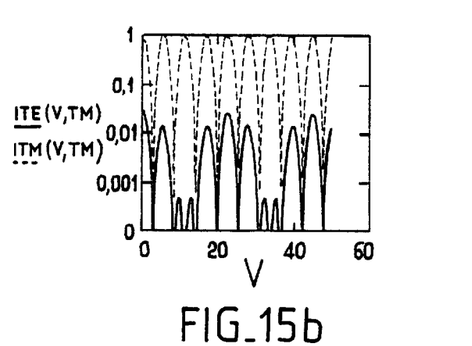
Figure 16:
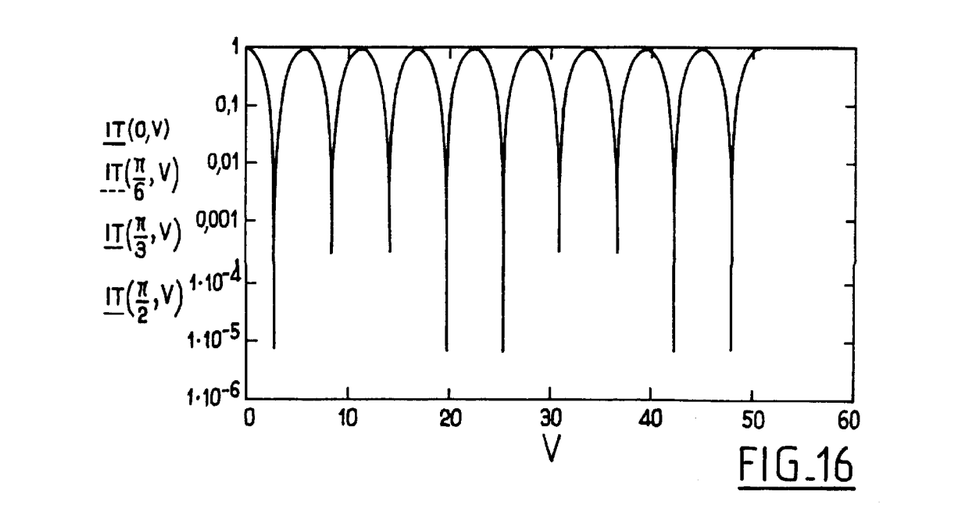

Mirror type modulators are suitable for large-scale applications in an FTTH network. Inserting a polarization converter in each arm of the modulator (FIG. 5) enables the modulator to be made insensitive to polarization. This is illustrated in FIGS. 15a, 15b, and 16 for arms each containing two phase modulators in series with a TE⇌TM converter. It should be observed that in this case the light wave passes twice through the converter, and outlet polarization is therefore identical to inlet polarization. The push-pull effect shown makes it possible in this case to reduce the extinction voltage.

Figure 17:
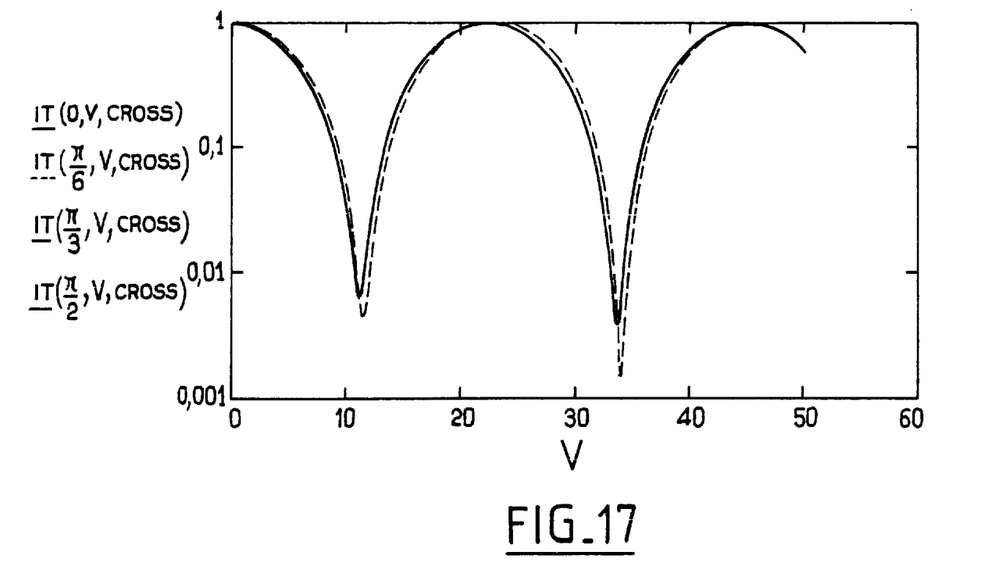
FIGS. 17 and 18 are graphs on which total intensity output from a polarization-insensitive directional coupler is plotted for various input polarization angles as a function of modulating voltage, for the signals corresponding to the CROSS and the BAR states of the FIG. 7 coupler.
Figure 18:
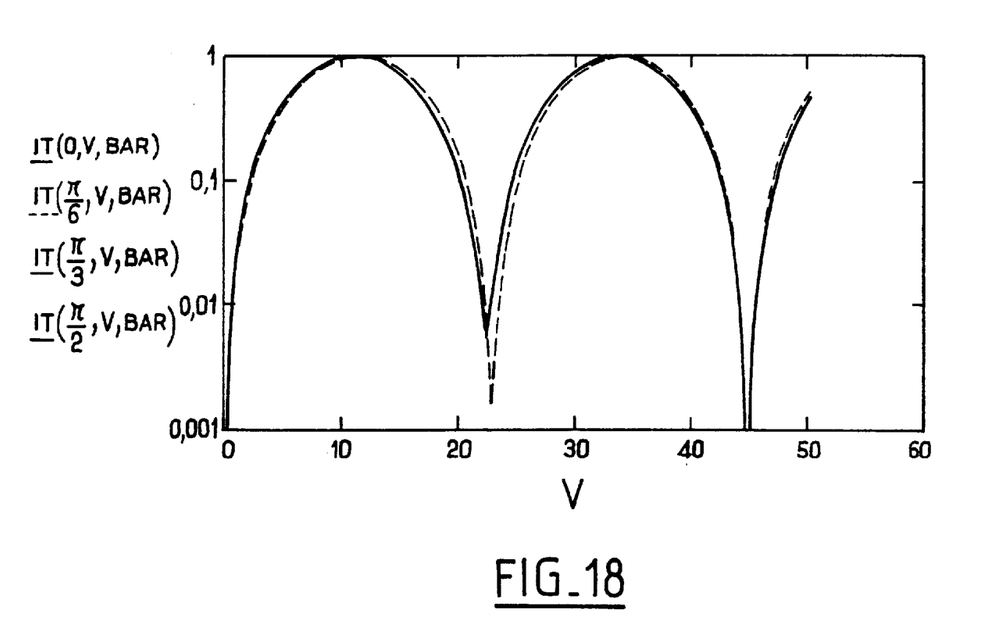

The behavior of a polarization-independent directional coupler (FIG. 7) is shown in FIGS. 17 and 18 where curves are plotted repenting total outlet intensities for various inlet polarization angles as a function of the modulation voltage for the CROSS state and for the BAR state. It is assumed that the optical signal is incident in one arm of the coupler. The intensity that emerges from the outlet arms of the coupler for various (linear) polarizations at the inlet of the coupler are simulated. The CROSS state corresponds to a crossover: the optical signal has changed waveguide; the BAR state corresponds to a signal that remains in the same light guide.

The structures of advantageous switches and modulators are described below with reference to FIGS. 19 et seq.

Figure 19:
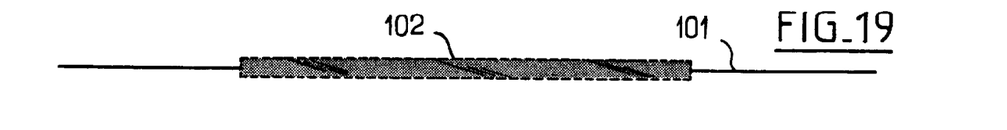
FIG. 19 shows a modulator in accordance with a known prior art embodiment.

FIG. 19 shows an example of a prior art capacitive modulator. It comprises a light guide 101 which extends linearly and which is made of an electro-optical material, together with an electrode 102 which extends over a fraction of the length of the light guide 101. With metallization connected to ground deposited on the other side of the light guide 1, the electrode 102 makes it possible to generate an electric field in said light guide 101 suitable or modifying its refractive index.

It is known that an electro-optical modulator is characterized by the product $V_\pi L$ where L is the path length travelled by the light and $V_\pi$ is the half-wave voltage of the modulator, i.e. the voltage required for applying a phase shift of a to the light wave.

For electro-optical polymers:

$$V_\pi L = \frac{\lambda \cdot d}{n^3 \cdot r_{\text{eff}}}$$

where $\lambda$ is the operating wavelength, d is the inter-electrode distance, n is the refractive index of the core-forming material, and $r_{\text{eff}}$ is the effective electro-optical coefficient.

For $\lambda=1.3$ μm, d=5 μm, n=1.6, and $r_{\text{eff}}=10$ pm/v, then $V_\pi L \approx 0.16$ Vm, i.e., for an operating voltage of 10 V, an optical path length of 1.6 cm.

Thus, with a modulator of the prior art as shown in FIG. 1, the length of the modulator must be not less than 1.6 cm for an electrode width of 10 μm.

Figure 20:
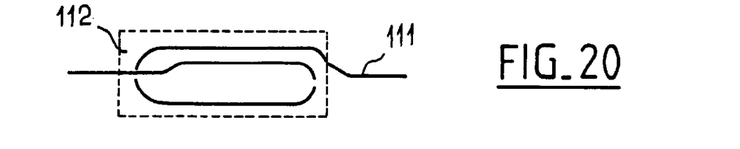
FIGS. 20 to 25 show modulators constituting various possible embodiments of the invention.

FIG. 20 shows a phase modulator constituting one possible embodiment of the invention.

The light guide 111 of this modulator is folded back twice and is in the form of an elongate loop. The various portions of said modulator which extend in juxtaposed manner in said loop are overlaid by a layer of metallization 12 which constitutes a control electrode of the modulator.

The waveguide is designed to accept considerable bending, e.g. by selecting for the core and the cladding materials that have a large difference of refractive index, such as those described in the following publication:

J. Liang, R. Levenson, and J. Zyss, ACS/OSA 93 (Toronto)—Topical Meeting—Organic Thin Films for Photonic Applications, "Design and fabrication of electro-optic polymer waveguides".

Such materials make tight curves possible.

In particular, they make it possible to fabricate folded light guides.

As will have been understood, a modulator configuration of the type shown in FIG. 20 makes it possible for a given value of $V_\pi$ to reduce the length of the modulator considerably.

In particular, in order to reduce the length of a component by an integer factor N, it suffices to fabricate ½(N−1) loops.

Thus, in the above-described example, the modulator extends over 0.5 cm for a total optical length of 1.6 cm.

The width of the electrode 112 is 200 μm.

Also, such a folded light guide configuration can be used to decrease the value of $V_\pi$ for fixed component size.

If it is desired for a given size of modulator to reduce the voltage $V_\pi$ by a ratio N, then it suffices to make a component of the type shown in FIG. 20, having ½(N−1) loops.

Naturally, other embodiments of the invention are possible.

Figure 21:
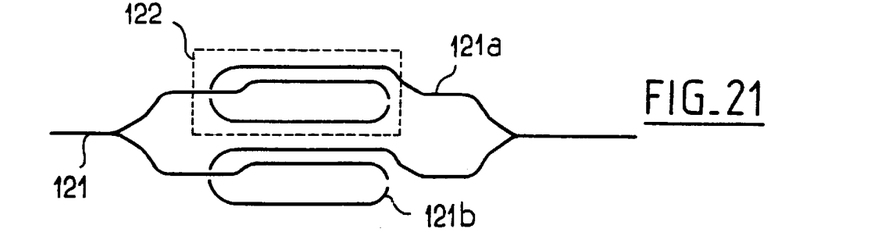

For example, FIG. 21 shows a Mach-Zehnder type intensity modulator in which the two light guide branches 121a and 121b are looped, an electrode 122 being superposed over the loop portion belonging to the branch 121a.

Figure 22:
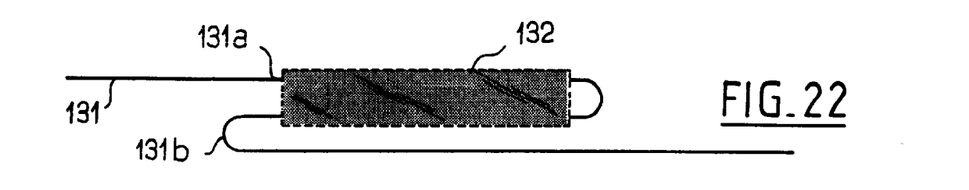

FIG. 22 shows another phase modulator configuration.

The light guide 131 is folded therein in a hairpin configuration.

An electrode 132 is superposed over two juxtaposed portions 131a and 131b of the light guide 31.

The modulators described above with reference to FIGS. 20 to 22 are capacitive modulators used at low control frequencies (less than a few GHz).

The control frequency passband of such capacitive modulators is given by their RC constant where R is resistance and C is capacitance.

For a loop modulator, in order to determine said passband, it is necessary to add the limitation due to optical delay in the loop: for a loop having a length of 1 mm, the interfering cutoff frequency is of the order of 100 GHz. The effect of the loop is therefore negligible.

Figure 23:
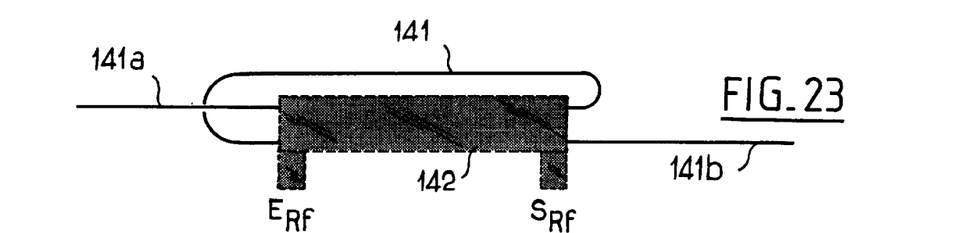

FIG. 23 shows a travelling wave modulator in accordance with the invention.

The light guide 141 of this modulator is looped. A layer of metallization 142 is linearly superposed on two parallel portions 141a and 141b of the light guide 141. These portions 141a and 141b are such that the optical signal propagating therein does so in the same direction.

The metallization 142 is used as a line for transmitting a microwave frequency radio signal from an inlet $E_{Rf}$ to an outlet $S_{Rf}$, the inlet $E_{Rf}$ being connected to a microwave source.

The optical signal propagates in the same direction in both portions 141a and 141b. The propagation direction of the radio signal is the same as that of the light waves, thereby making it possible to achieve phase tuning between the light waves and the microwaves.

The modulator constituted in this way is a travelling wave modulator.

The effectiveness of the modulation is proportional to the following term:

$$r_{loop} = \cos \tfrac{1}{2}\omega\tau_{loop} \sin \tfrac{1}{2}\omega\tau_{electrode}$$

where $\omega$ is equal to $2\pi\nu$, $\nu$ being the common frequency of the electrical waves and the light waves; and where $\tau_{loop}$ and $\tau_{electrode}$ designate the optical delays due respectively to the loop and to the electrode.

Specifically, $\tau_{loop}$ is greater than $\tau_{electrode}$.

For an equivalent linear modulator (transmission line of twice the length), the corresponding coefficient would be:

$$r_{linear} = \sin c\,(\omega\tau_{electrode})$$

The ratio of these coefficients is therefore equal to:

$$\frac{r_{loop}}{r_{linear}} = \frac{\cos \tfrac{1}{2}\omega\tau_{loop}}{\cos \tfrac{1}{2}\omega\tau_{electrode}}$$

Consequently, the passband of a looped travelling wave modulator is smaller than that of a linear modulator, and is determined by the length of the loop.

Nevertheless, the advantage of a looped travelling wave modulator lies in the microwave line being shorter than for a linear modulator, and as a result less power is dissipated in the modulator.

Figure 24:
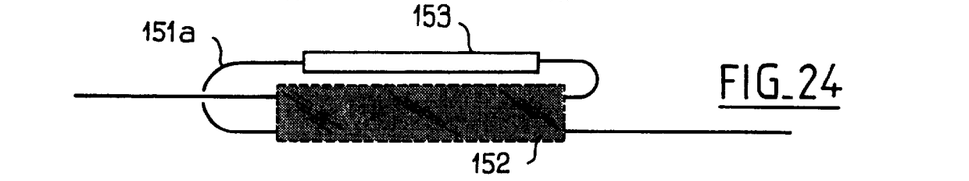
Figure 25:
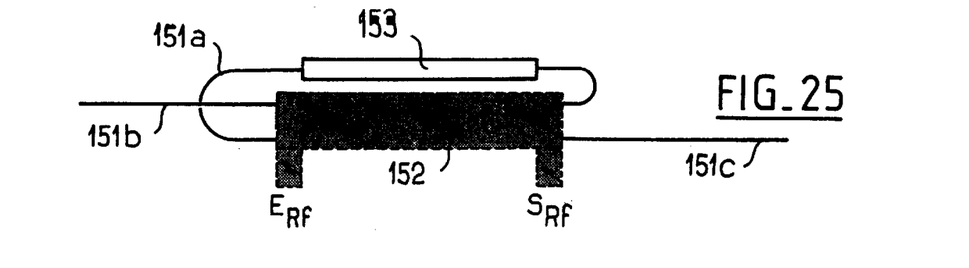

Reference is now made to FIGS. 24 and 25 which show polarization-independent looped modulators respectively of the capacitive type and of the travelling wave type.

The light guide 151 of these modulators has an intermediate portion 151a which, in said light guide 151 is interposed between two linear portions 151b and 151c of the same length and covered by common metallization 152, said intermediate portion 151a not itself being covered by said metallization 152.

This intermediate portion 151a has a passive TE⇌TM converter 153, e.g. of the type described in the above-mentioned article.

With such a configuration, a first polarization of the optical signal is modulated as it passes along the inlet branch 151b of the modulator.

Thereafter, modulation is inverted by the passive converter 153 as it passes through the intermediate branch 151a, and the second polarization is modulated during the second pass through the loop, i.e. when the optical signal passes along the outlet branch 151c of the modulator.

Such a modulator thus has the advantage of making it possible to modulate two polarizations using a single electrode.

Consequently, it is not necessary to provide transverse electrodes, thereby considering simplifying fabrication.

I claim:

1. An optical component including a light guide (111, 121, 131, 141, 151) whose core is made of an electro-optical material, together with at least one area of metallization (112, 122, 132, 142, 152) over a portion of said light guide, for the purpose of controlling it, the component being characterized in that said light guide (111, 121, 131, 141, 151) is folded and in that the metallization (112, 122, 132, 142, 152) extends over at least two portions of the light guide extended in folded manner relative to each other.

2. A component according to claim 1, characterized in that the electro-optical material is a polymer material.

3. A capacitive component according to claim 1 or 2, characterized in that the metallization (112, 122, 132, 152) is a control electrode for said component.

4. A travelling wave component according to claim 1 or 2, characterized in that the metallization (142, 152) is a microwave transmission line, and in that the optical signal propagates in the portions (141, 141b; 151b, 151c) of the light guide over which said metallization (142, 152) extends along the same axis and in the same direction as the microwave signal which propagates in said metallization.

5. A component according to any one of claims 1 to 2, characterized in that the light guide (151) includes a polarization converter (153) between two portions (151b, 151c) over which the control metallization (152) extends.

6. A modulation component according to any one of claims 1 to 2.

7. A switching component according to any one of claims 1 to 2.

* * * * *

UNITED STATES PATENT AND TRADEMARK OFFICE
CERTIFICATE OF CORRECTION

PATENT NO. : 5,930,412
DATED : July 27, 1999
INVENTOR(S) : Toussaere It is certified that error appears in the above-identified patent and that said Letters Patent is hereby corrected as shown below:

In column 6, line 22, delete "phase shift of a" and insert -- phase shift of $\pi$ -- .

Signed and Sealed this

Twenty-seventh Day of March, 2001

*Attest:*

NICHOLAS P. GODICI

*Attesting Officer*   *Acting Director of the United States Patent and Trademark Office*